United States Patent [19]

Postema

[11] Patent Number: 5,765,645
[45] Date of Patent: *Jun. 16, 1998

[54] AERATOR WHEEL

[76] Inventor: Leonard F. Postema, 1158 Ranchwood Trail, Woodstock, Ga. 30188

[*] Notice: The term of this patent shall not extend beyond the expiration date of Pat. No. 5,586,604.

[21] Appl. No.: 718,204

[22] Filed: Sep. 20, 1996

Related U.S. Application Data

[63] Continuation-in-part of Ser. No. 584,980, Jan. 11, 1996, Pat. No. 5,586,604, which is a continuation-in-part of Ser. No. 508,322, Jul. 27, 1995, Pat. No. 5,623,996, which is a continuation-in-part of Ser. No. 252,244, Jun. 2, 1994, Pat. No. 5,579,847.

[51] Int. Cl.$^6$ .................................. A01B 45/02
[52] U.S. Cl. ............................. 172/21; 172/556
[58] Field of Search ..................... 172/21, 22, 24, 172/548, 556, 540, 544, 541, 611, 662; 111/135, 136; 56/256

[56] References Cited

U.S. PATENT DOCUMENTS

| | | | |
|---|---|---|---|
| 1,217,326 | 2/1917 | Meinecke. | |
| 1,288,608 | 12/1918 | Johnson. | |
| 1,744,597 | 1/1930 | Vasconcellos. | |
| 1,770,648 | 7/1930 | Johnson | 172/548 |
| 2,243,241 | 5/1941 | Burns | 172/556 |
| 2,323,460 | 7/1943 | Domrese et al. | 172/548 |
| 2,325,997 | 8/1943 | Kelly et al. | 172/548 X |
| 2,501,364 | 3/1950 | Traver | 97/212 |
| 2,580,236 | 12/1951 | Mascaro | 97/52 |
| 2,614,375 | 10/1952 | Calkins | 172/548 X |
| 2,975,735 | 3/1961 | Purvance | 111/6 |
| 3,796,028 | 3/1974 | Federspiel | 56/15.2 |
| 3,799,079 | 3/1974 | Dietrich | 111/7 |
| 4,020,907 | 5/1977 | Luck | 172/554 |
| 4,102,406 | 7/1978 | Orthman | 172/548 X |
| 4,750,441 | 6/1988 | Pfenninger et al. | 111/85 |
| 4,776,404 | 10/1988 | Rogers et al. | 172/21 |
| 4,991,660 | 2/1991 | Horváth et al. | 172/556 X |
| 5,209,306 | 5/1993 | Whitfield | 172/21 |
| 5,579,847 | 12/1996 | Postema | 172/21 X |
| 5,586,604 | 12/1996 | Postema | 172/21 |

FOREIGN PATENT DOCUMENTS

| | | |
|---|---|---|
| 651522 | 1/1964 | Belgium. |
| 1531869 | 12/1989 | U.S.S.R.. |

*Primary Examiner*—Michael J. Carone
*Assistant Examiner*—Robert Pezutto
*Attorney, Agent, or Firm*—Isaf, Vaughan & Kerr

[57] ABSTRACT

A unique aerator wheel assembly has a hub and four equally spaced, outwardly projecting, curved tines. The tines are uniquely shaped and configured so that as one tine begins to pierce the ground, the previous tine, which is fully submerged in the ground, is lifted vertically up and out of the ground through the action of the entering tine. This unique configuration provides an aerator wheel assembly that is small and lightweight enough to be pulled behind a common lawn mower.

16 Claims, 3 Drawing Sheets

| PARAMETER | RANGE | PREFERED VALUE |
|---|---|---|
| STRAIGHT PORTION (31) OF TINES | $0 - .5\, R_h$ | $.2\, R_h$ |
| $R_t$ | $1.5\text{-}3.5\, R_h$ | $2.5\, R_h$ |
| $\alpha$ | 45-85 DEGREES | 65 DEGREES |

TABLE 1  SHAPE PARAMETERS FOR TINES ($R_h$= RADIUS OF HUB)

AERATOR WHEEL

REFERENCE TO RELATED APPLICATIONS

This application is a continuation-in-part of application serial number 08/584,980, filed Jan. 1, 1996 now U.S. Pat. No. 5,586,604, which is a continuation-in-part of application Ser. No. 08/508,322 now U.S. Pat. No. 5,623,996, filed on Jul. 27, 1995; which, in turn, is a continuation-in-part of application Ser. No. 08/252,244, filed on Jun. 2, 1994, now U.S. Pat. No. 5,579,847.

TECHNICAL FIELD

This invention relates generally to lawn care, and more particularly, to devices for aerating the soil of a lawn to cultivate thick and healthy grass. Specifically, the invention relates to an improved aerator wheel configuration that provides superior aeration with a minimum size and weight requirement.

BACKGROUND OF THE INVENTION

Modern lawns require a great deal of care and attention in order to nurture a thick, green carpet of grass. Such care includes consistent mowing, watering, and de-thatching, as well as periodic overseeding and fertilization. In addition, it is imperative that a healthy lawn be aerated at least twice a year and, preferably, even more often. Aeration usually entails creating a multitude of closely spaced small holes in the surface of the ground to assist in the absorption of nitrogen, air, and nutrients into the soil. The holes also tend to increase moisture penetration into the soil and serve as receptacles for grass seed to prevent the seed from being washed away and to promote germination and growth and allow a place for decomposing organic matter to easily get below the surface to lower rootering areas. It is also widely accepted that bringing soil from deep below the surface to the surface or thus rotating the soil is very beneficial by helping to promote decomposition of organic materials to enrich the soil's condition.

Numerous lawn aeration devices have been available. One such device comprises a large cylindrical drum studded about its periphery with a plurality of short radially extending spikes. An example of this type of aerator is illustrated in U.S. Pat. No. 3,794,121 of Drozak. In use, the drum is rolled or pulled over the ground, and as it rolls, the spikes are driven into the soil to create shallow holes. While this device is widely used and has proven somewhat successful, it is nevertheless plagued with numerous problems and shortcomings inherent in its design. For example, since the spikes necessarily engage the ground at an angle and are rotated laterally through the soil, significant forces are required to penetrate the ground and move the spikes through the dirt. As a result, the drums of these devices generally are relatively large and usually are filled with water or sand to provide sufficient weight to drive the spikes into and through the soil. In some instances, auxiliary racks are provided to load even more weight onto such aerators. To frustrate matters more, the density of spikes on the drum and thus the density of holes the aerator can make in the soil is severely limited since the weight of the device is inherently inadequate to drive more than a few of the spikes at a time into and through the soil. Finally, as each of the spikes of this device is forcibly driven into the soil, it pushes aside and down the dirt to make room for the spikes. This is the action that actually creates the holes; however, it also necessarily compacts and hardens the soil around the sides and bottom of the hole.[1] As a result, penetration of air from within the hole into surrounding soil is reduced as is the penetration of moisture. Consequently, the efficiency and advantages of the aeration are reduced.

[1] In fact, excavators use large versions of this same principle called sheeps foot hence to compact soil on newly earth filled sites to increase support for footing for intended structures.

Another lawn aeration device seeks to address the soil compaction problems of drum and spike aerators by providing hollow spikes that are mounted on a common drum or common axle and that actually pierce the ground and remove a plug of soil to create a hole. These hollow spheres are necessarily larger in diameter than solid spikes to accommodate a sufficiently large central hole. During each penetration of the ground, another soil plug is forced upwardly through the hollow spike pushing against the resistance of the previous plug, further compacting the plugs, to slide it further into the hollow spike until the plugs are simply ejected from the spike at its upper extent. This does provide the added benefit of rotating the soil to the surface by bringing up a plug but the soil is not rotated up from the bottom of the hole. The pressures produced by the penetrating hollow spike cause the soil from the top portion of the hole being created to be pressed and thus compacted to the sides of the hole and into the center hole of the spike, while the soil in the lower portion of the hole is pressed and thus compacted to the sides and bottom of the hole. While these types of devices, commonly known as pluggers or core-type aerators, tend to reduce slightly the compaction of the soil around the sides of the holes as compared to spike-type aerators, they fall far short of eliminating it. This is because the soil must still be parted to accommodate the thickness of the walls of the hollow spikes as they pierce the soil. In addition, such hollow spike aerators still require significant force to drive them into and through the soil and thus still require large, heavy, and cumbersome structures for proper operation. This is due to the relatively high sliding friction of the soil plug through the hole in the spike requiring extra force to drive the plug through the soil. As a result of this extra force, the extracted plugs are usually highly compacted dowel-like plugs, which do not break up and disperse quickly.

Because of their large size and required weight, many aerators must be pulled like trailers behind larger tractor-type equipment making them clumsy or impossible to maneuver in smaller sights like residential and smaller industrial/commercial sites. To overcome the restrictions caused by the size of this tractor/trailer combination, smaller self-propelled motor driven units are manufactured to better fit small sites, but because of their design with existing technology, are still heavy, awkward, and clumsy to operate. This not only makes them expensive, but also renders them difficult to use. When the heavy spiked drums are driven over the ground by their motors, they naturally bump, bounce, and shake about as the spikes are driven into and through the soil. This can create significant fatigue for the users of these aerators. Further, the unitary drum construction of these devices renders them very difficult to turn at the end of an aerating run and the drum often must be manually scraped about in an arc to achieve the turn or lifted out of the ground manually by rocking the unit up onto wheels or a roller ahead or rearward of the tines or mechanically latching wheels down to lift the heavy unit. Not only is this cumbersome and tiring, if not lifted, it also tends to destroy healthy grass already growing in the lawn and can create an unsightly mess, particularly in moist or wet soil.

Slicer-type aerators having harrow-like discs or thin blades resembling a disc with notches cut into it that create or cut a narrow furrow, slice, or series of narrow slices in the soil, are also available. One such device is illustrated in U.S. Pat. No. 3,993,143 of Moreland, Jr. These devices embody a problem in that they tend to create narrow soil openings that close up very quickly, especially when stepped upon. In addition, the force required for penetration of the soil, even though less than plugger or spike-type aerators, can still be significant in these types of aerators so that substantial weight must be provided for their operation. As a result, these types of aerators are not as common as plugger or core-type aerators and tend to be mounted on frames that can be pulled behind a tractor. To facilitate the slicing action of these aerators, the round blades on some designs rotate like a saw blade by an external motor or power take-off so that the blades of the aerators actually cut and slice through the soil. Obviously, these limitations restrict the use of such aerators. In addition, the narrow slot produced is too small to allow seed and organics to move into the slot and below the soil's surface and almost no soil is brought to the surface making them unacceptable.

Other aeration devices that embody the foregoing problems in various degrees are disclosed in U.S. Pat. Nos. 1,288,608 of A. L. Johnson, 5,209,306 of Whitfield, 2,975,735 of Purvance, 1,217,326 of Meinecke, 1,744,597 of Vasconcellos, 2,501,364 of Traver, 2,580,236 of Mascaro, 4,020,907 of Luck, 3,796,028 of Federspiel, 3,799,079 of Dietrich, 4,750,441 of Pfenninger, 4,776,404 of Rogers, and 651,522 of Ruhr-Stickstoff.

A review of the foregoing patents and a review of the prior art devices available illustrates that, in general, aeration devices of the prior art have been massive heavy contraptions that are expensive to manufacture, expensive to purchase, difficult to store, inconvenient to use, and, in the case of hand operated powered units, extremely fatiguing, and, in some instances, ineffective to produce aeration holes that have loosely packed side walls to provide maximum aeration benefit. The design of a soil aerator wheel that is small in size, light in weight, but that nevertheless provides soil aeration of superior quality and attributes has long been an elusive goal of lawn equipment engineers. It has been believed that small size and light weight simply are incompatible with the often aggressive action required to pierce the soil and pull plugs therefrom.

Thus, there exists a continuing need for an aerator wheel assembly having a unique design that permits the assembly to be small and lightweight, yet provides superior aeration when pulled and not driven across the lawn. It is to the provision of such an aerator wheel assembly that the present invention is primarily directed.

SUMMARY OF THE INVENTION

Briefly described, the present invention, in one preferred embodiment thereof, comprises an improved aerator wheel assembly having a disc shaped central hub from which four tines radially project. The tines are spaced at 90° increments from each other and each tine is curved along a unique path in the direction of intended rotation of the aerator wheel. In addition, the thickness of each of the tines is relatively small compared to the width of the tine so as to provide a relatively thin knife blade-like configuration for each tine.

In the preferred embodiment, each of the tines curves through an arc of radius equal to about 2½ times the radius of the central hub of the wheel assembly. In addition, each tine spans about 65° of arc from the central hub to the end of the tine. With this configuration, the angle between a radius line extending from the center of the hub through the end point of each tine and a line extending along the direction of the tine at its end is approximately 33°. This differs markedly from prior art aerator wheels where the recited angle is specified to be much larger than 33°. In fact, U.S. Pat. No. 3,993,143 of Moreland actually teaches away from an angle as small as 33°. At column 4, beginning at line 47, Moreland recites that "in this regard, it has been found that the angle A should be at least about 45°, and preferably between about 50° to 60° so that the line defined by the point (of the tine) is directed substantially vertically when it contacts the ground line." Accordingly, the small angle defined by the configuration of applicant's tines is unique and contrary to the teachings of the prior art.

When the aerator wheel of the present invention is pulled across the surface of the ground, each of the tines engages and begins to pierce the ground at an acute angle of about 48° relative to the surface of the ground. Furthermore, each tine engages the ground at about the same time that the preceding tine extends vertically to its fullest extent into the soil. As the aerator wheel rotates further, the leading tine slides into the soil like a knife blade. Shortly after entering the soil, the curve of the tine begins to dictate the movement of the assembly across the ground. That is, since the tine is thin and knife-like in shape, as it moves into the ground, it begins to follow its own curve through the soil resisting movement in directions other than along its own curve. The result is that the rotation of the aerator wheel assembly is dictated by the tine slipping into the soil and is thus retarded or slowed from its normal rotational speed across the ground. Further movement of the aerator wheel causes the tip portion of the tine that is inserted into the soil to be pulled substantially straight up out of the soil with the flat backside of the tine riding on the front surface of the aeration hole rather like the runner of a sled. At the same time, a non-compacted plug of soil is pulled up by the curved tine and deposited on the surface of the ground. This plug includes soil that is brought up all the way from the bottom of the hole causing rotation of the surface of the deep down soil, unlike other designs that do not bring soil up from the bottom of their created holes. The upward force against the soil by the tine as it lifts out from its deepest penetration position causes the soil to the sides of the hole being created to lift and loosen. The root fiber in the side areas reinforce the soil, maintaining its cohesiveness and thus preventing the tine from lifting out a large cone-shaped portion of soil bearing an undesirable large, wide-open divot in the surface of the ground. Thus, the lifting and loosening of the side walls becomes restricted by the roots and the results are a broader volume of the surface soil being loosened than with other designs. The ultimate result is a greatly improved aeration pattern wherein the aeration holes are deep relative to the length of the puncture hole in the ground, have loose uncompacted sides, and are spaced apart a distance that is ideal for aerating a lawn.

The unique configuration of the aerator wheel of the present invention permits an assembly that is small and extremely lightweight when compared to other aeration devices. This is because the unique configuration and action of the tines causes the aerator wheel to dig into the ground rather like the talons of an eagle as it is moved across the ground. Accordingly, very little, if any, additional weight is required to drive the tines into the ground since the trailing tine pulling out of the ground tends to provide force for driving the next leading tine into the ground. In addition, the forward motion of the assembly itself aids in driving the tines into the soil as a result of the acute angle at which they initially pierce the ground. Accordingly, for the first time, an aeration device can be made small and lightweight enough to attach to the back deck of a lawn mower as described in the parent applications hereto.

The foregoing and other objects, features, and advantages of the present invention will become more evidence upon review of the detailed description set forth below when taken in conjunction describe accompanying drawings, which are briefly described as follows.

DETAILED DESCRIPTION OF THE PREFERRED EMBODIMENT

Figure 1:
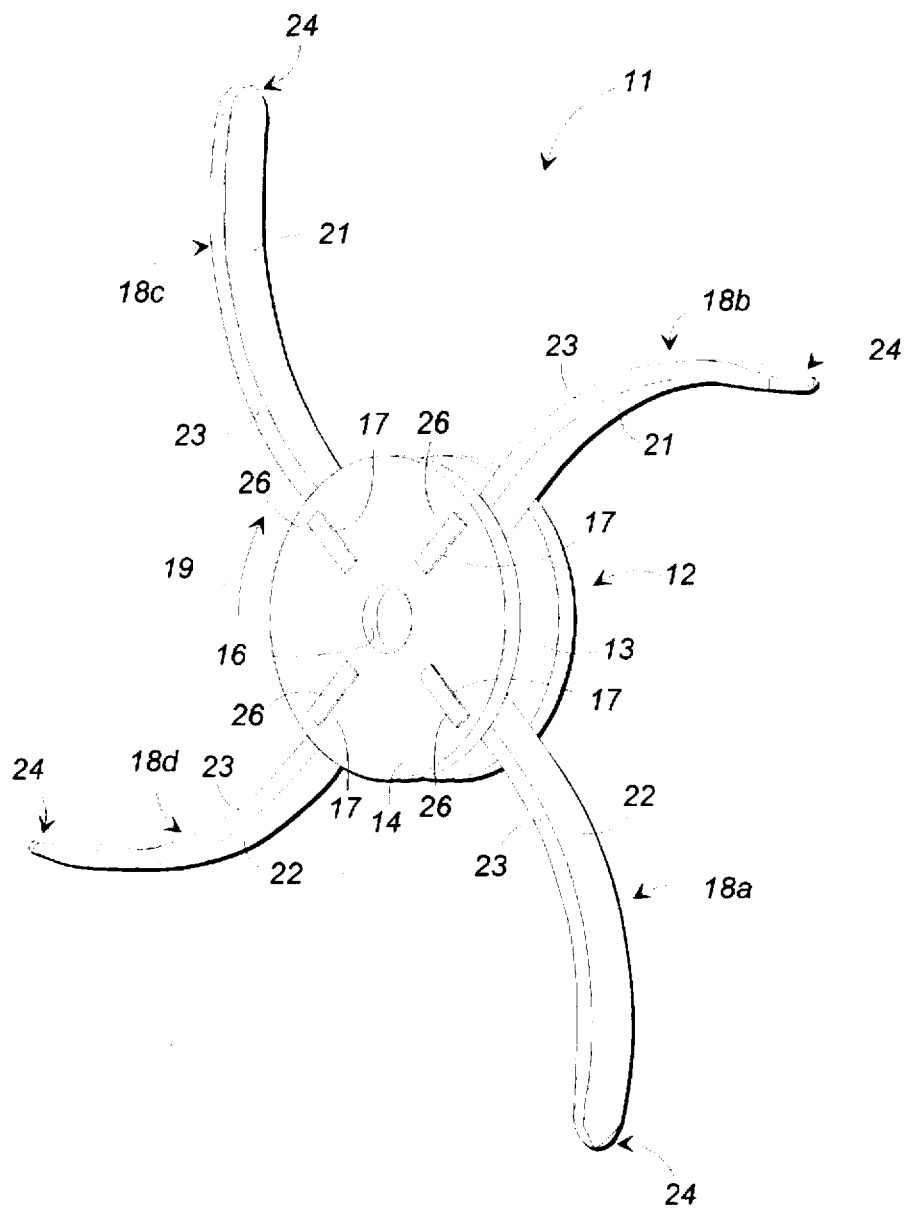
FIG. 1 is a perspective view of an aerator wheel that embodies principles of the present invention in a preferred form.

Referring now in more detail to the drawings, in which like numerals refer to like parts throughout the several views, FIG. 1 illustrates an aerator wheel assembly 11 that embodies principles of this invention in a preferred form. The wheel 11 comprises a hub 12 from which four curved tines, designated 18a, 18b, 18c and 18d project. In the preferred embodiment, the hub 12 comprises a first hub plate 13 and a second hub plate 14 that are each generally disc shaped and spaced from each other with the base of the tines captured between the hub plates. Each of the hub plates 13 and 14 have corresponding slots 17 radially arrayed thereabout at 90° increments from each other. The slots 17 receive corresponding tabs 26 that project laterally from the bases of the tines 18a through 18d to hold the tines in place captured between the hub plates 13 and 14. Each of the hub plates 13 and 14 also has a central bore 16, which is adapted to receive an axle on which the aerator wheel 11 can be rotatably mounted.

The four tines 18a–18d project outwardly from the hub 12 and are spaced at 90° increments around the hub. Each of the tines has a front face 21, a rear face 22, and side edges 23. Most preferably, as shown in FIG. 1, the tines are significantly wider than they are thick. That is, the front and back faces 21 and 22 are wider than the sides 23. With this configuration, each of the tines forms a thin knife-like structure, which provides advantageous functionality as detailed below. Each of the tines is curved along a unique arc in the direction of intended rotation of the aerator wheel across the ground (indicated at numeral 19). The tines initially project radially straight outwardly from the hub 12, but very shortly thereafter begin their curved arc to distal ends 24. Preferably the distal ends 24 of the tines are honed or sharpened to a point that can pierce the soil of a lawn easily during operation of the aerator wheel.

It will be understood that the aerator wheel of FIG. 1 can be mounted to various support frame assemblies in various ways during use. Examples of such possible support frames are described in the parent applications to the present application, the disclosures of which are hereby incorporated by reference. When mounted to such support frames, one or more of the aerator wheels 11 is rotatably mounted on an axle that, in turn, is a part of the support frame. Preferably, such support frames are adapted to be mounted to the deck of a lawn mower so that the aerator wheels 11 mounted thereto can be pulled across the ground behind the lawn mower as the mower is pushed or propelled across a lawn. The unique configuration of the aerator wheel of this invention allows for the small size and weight adapted to be attached to a mower, whereas prior devices have been much too large to be used in this way.

Figure 2:
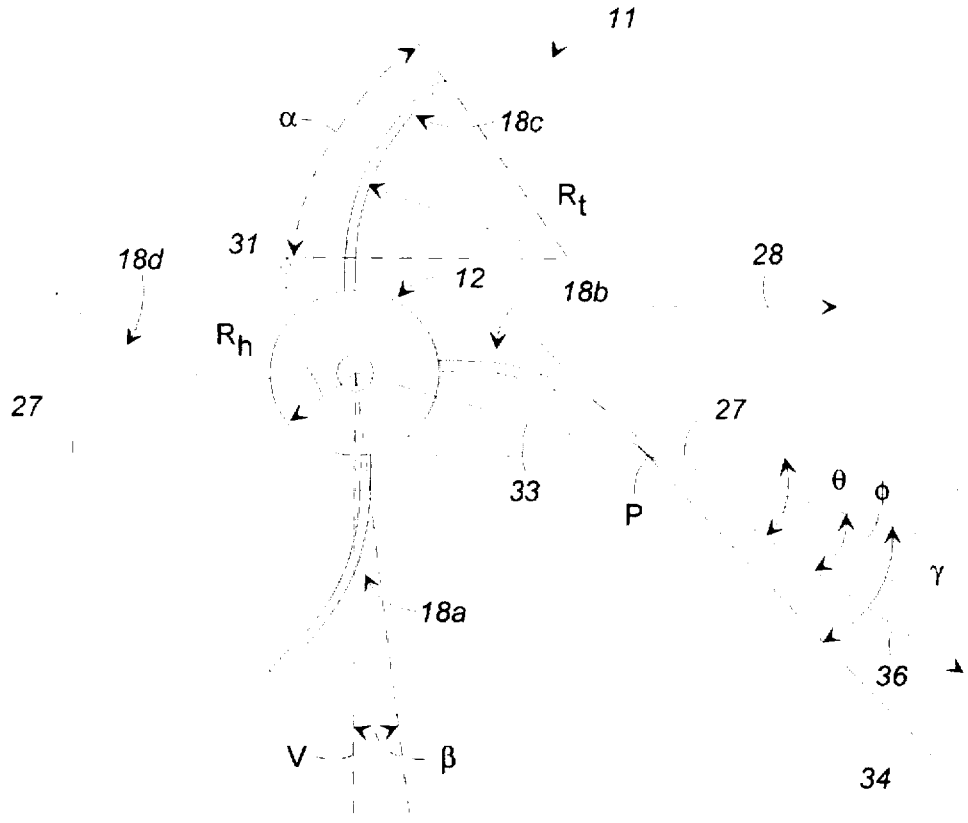
FIG. 2 is a side elevational view of the aerator wheel of FIG. 1 illustrating the geometric configuration of its components.

FIG. 2 illustrates the unique geometry of the present aerator wheel that results in its small size and minimum weight requirements while still providing superior aeration for consumer and commercial lawns. The aerator wheel 11 is shown in side elevational perspective sitting atop the ground 27 with a trailing tine 18a extending downwardly from the hub 12 and being fully emerged in the ground. A leading tine 18b is just contacting and beginning to pierce the ground 27 at point P.

To illustrate the geometry of the present invention, various lines of reference are depicted in FIG. 2. A radius line 33 extends radially outwardly from the center of the hub 12 and passes through the end point of the leading tine 18b. A tine extension line 34 is drawn through the end of the leading tine 18b and extends in the direction of the tine point. A direction vector 36 indicates the actual direction in which the end of the leading tine 18b is moving upon contact with the ground as the aerator wheel 11 is pulled in direction 28. The hub 12 itself has a radius indicated at $R_h$.

As illustrated with specific reference to tine 18c, each of the tines initially projects radially outwardly from the hub 12 a relatively short distance indicated at 31. The tine then curves through an arc of radius $R_t$ and extends through or subtends and angle $\alpha$ about such radius. In FIG. 2, $\theta$ is the angle between the surface of the ground 27 and the direction vector 36. $\Phi$ is the angle between the radius line 33 and the direction vector 36, and $\gamma$ is the angle between the radius line 33 and the tine point extension line 34. V is the vertical extending through the center of the hub 12 and $\beta$ is the angle between the direction at which the trailing tine 18a projects from the hub into the ground relative to the vertical V when the leading tine 18b just contacts the surface of the ground 27.

The applicant has discovered that there is a unique relationship between the radius of the hub 12 and the various other parameters indicated in FIG. 2 that provides the unique small, lightweight, efficient operation of the aerator wheel of this invention. More specifically, the inventor has discovered that, for a hub of a given radius $R_h$, the straight or radially extending portion 31 of the tine should be about $0.2R_h$, the radius $R_t$ about which the tine curves should be about $2.5R_h$, and the tine should extend through an angle $\alpha$ of about 65°. While this specific configuration of the tines has been found to be preferable and represents the best mode known to the inventor at the time of filing the present application for carrying out his invention, it should be understood that the various parameters that define the shape of the tine could be varied within certain ranges with perhaps acceptable results, even though the inventor believes that such results would be non-optimum. For example, the straight radially projecting portion 31 of the tine 18 might vary in length from about 0 (in which case the tine would begin to curve immediately upon projecting from the hub) and about $0.5R_h$. Likewise, the curved portion of the tine 18 might extend through an arc of radius $R_t$ between about $1.5R_h$ and $3.5R_h$. Finally, the angle $\alpha$ subtended by the curve portion of the tine might fall within the range of from about 45° to about 80°. Modifications of the shape of the tines 18 within the specified ranges naturally would cause consequent changes in the values of $\theta$, $\Phi$, $\gamma$ and $\beta$, and point P.

While selection of parameters within the specified ranges are possible and are within the scope of this invention, the invention will be described in the balance of this specification with respect to the preferred values of the parameters as presented above, since these values are believed to be the best mode for carrying out the invention.

With the tines 18 shaped and configured according to the preferred values of $R_t$ and a as recited above, it has been found that $\theta$ is about 33°, $\phi$ is about 18°, and $\gamma$ is about 33°. Thus, the point of each tine engages the surface of the ground 27 at a relatively small acute angle of about 48°. This is a radical departure from aerators of the prior art, wherein it is taught that the aerator points should pierce the ground substantially vertically. In U.S. Pat. No. 3,993,143 of Moreland, for example, it is stated at column 4, line 50 that the point of the tine "is directed substantially vertically when it contacts the ground line 21." Furthermore, in applicant's invention, the angle between the radius line 33 of the aerator wheel and the tine point extension line 34 is about 33°. This, too, is a radical departure from the prior art. In fact, Moreland, at Column 4, beginning at line 47, actually teaches away from such a small angle. There, it is stated that "in this regard, it has been found that the angle A should be at least about 45°, and preferably between 55° to 60° . . . ." Applicant's angle of 33° is clearly outside of the range and reasoning of Moreland. However, such an angle, in conjunction with the unique shape and configuration of the tines relative to the hub, has been discovered to provide the unique function of the present invention for aggressively aerating the soil with a small lightweight aerator wheel that can be attached to the back of a common lawn mower.

Figure 3:
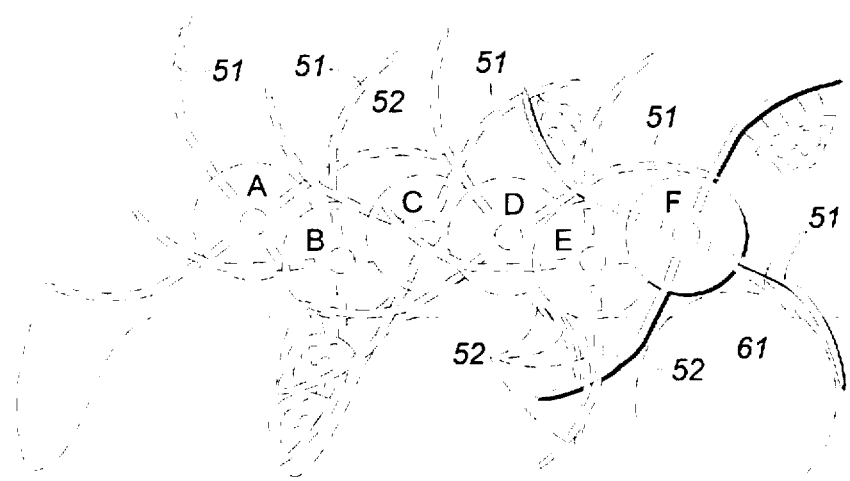
FIG. 3 illustrates in sequential form movement of the aerator wheel of the present invention across the ground to aerate the soil.

FIG. 3 illustrates the function of the present invention for aerating the soil. Specifically, an aerator wheel of this invention is shown in six sequential positions as it moves across the ground. From this sequential illustration, it can be seen that, as the aerator wheel is pulled across the ground moving sequentially from position A to position F, one tine pierces the ground and the hub rotates until this tine extends substantially vertically into the soil, becoming the trailing tine.

At this point, the next or leading tine contacts and begins to pierce the soil. As this leading tine slips into the soil, its curved, knife blade-like shape begins to dictate the movement and rotation of the entire assembly. That is, the leading tine begins to slip into the earth along its curve and the resistance to movement of the tine in other directions ensures that this tine follows the predetermined path. This, in turn, causes the hub of the aerator wheel to raise up off the ground and move through an arc 61 following the movement of the leading tine into the soil.

As a result of the motion of the assembly being dictated by the shape of the leading tine, the hub rotates slower than it normally would rotate if it were simply rolling across the ground. This, in turn, prevents the trailing tine from being simply swung back up and out of the ground creating a long undesirable slot. Instead, the tip of the trailing tine is pulled substantially straight up out of the ground and the back face of the tine rides on the forward edge of the hole that has been created, rather like the rail of a sled. At the same time, this same trailing tine is pushing up against the soil from underneath to tear a hole up through the soil as it carries up a plug of uncompacted soil. This action provides much of the downward force required to drive the leading tine into the ground. The result is an aeration hole that is much deeper than the width of its mouth at the ground surface and spaced apart from the other holes a distance suitable for proper aeration. In addition, since downward force is provided by the trailing tine pushing a hole up through and pulling a clump of earth out of the ground, the aerator wheel of this invention tends to "dig in" to the ground like the talons of an eagle and requires very little additional downward force for proper operation. The acute angle of entry of each tine in conjunction with the horizontal forces exerted on the assembly as it is pulled across the ground further helps to drive the tines into the soil, reducing even further any added weight requirement.

The aerator wheel assembly of this invention provides an action in the soil that produces a hole that has dominantly uncompacted and loosened sides and uncompacted bottom and that is approximately three times deeper than the size of its surface opening. To produce such a narrow dimensioned opening, it is necessary to alter the rotation and movement of the aerator wheel assembly as it is drawn across the surface of the soil. In the prior art, this is usually done through mechanical linkages and/or cams, etc., that are coupled to rotate or drive the aerator wheels at a rate different from the natural rotation rate that would result from the wheels simply being pulled across the ground. Obviously, such mechanical linkages make these aerating assemblies very heavy, complex, and expensive. In contrast, applicant's invention slows or retards the natural rotation rate of the aerator wheel as each tine moves up and out of the ground by making use of the natural action of the next successive tine slipping into the ground along its curve. By slowing the rotation rate of the aerator wheel assembly in this way, the trailing tine, rather than rotating back and out of the ground as would be normal, tends to lift out of the hole more vertically and closer to its point of entry, producing the narrowest possible hole in the ground. Through its unique configuration, the interactions of the tines with the ground as the aerator wheel is drawn across the soil's surface allows the penetrated tine to withdraw from the soil in precisely this desirable manner without the use of heavy weights or powdered drive mechanisms. Because the aerator wheel of the present invention rotates at an average rate that is slower than its normal free rolling rate, this invention produces holes that are farther apart in the direction of travel that what would be produced by the assembly rotating at its free rolling rate, yet substantially closer than other designs. This fact becomes very important when the aerator wheel assembly must be very small for realistic use behind a small implement such as a twenty or twenty-one inch lawn mower or a hand-pushed aerator. One key advantage of the present invention over prior design, which dominantly create holes by pushing down from above, is that the holes created by the present invention are formed dominantly by pushing soil up through underneath. In order for an aerating wheel assembly to be usable behind smaller implements, it must be small. By nature of this small size, if the wheel were allowed to rotate at its free rolling rate, the holes produced would be much too close in the direction of travel. This inherent problem is solved in the present invention, which retards the rotation of the wheel from its free rolling rate to create holes that are farther apart, yet substantially closer than the other designs.

This invention has been described in terms of a preferred embodiment. It will be obvious to those skilled in this art, however, that various additions, deletions, and modifications might well be made to the illustrated embodiment without departing from the spirit and scope of the invention as set forth in the claims.

I claim:

1. An aerator wheel assembly adapted to be pulled across the ground to aerate a lawn, said aerator wheel assembly comprising a generally disc-shaped hub having a first radius and a plurality of tines projecting outwardly from said hub, each of said tines being curved in the direction of intended rotation of said aerator wheel assembly along an arc having a second radius of from about 1.5 times said first radius to about 3.5 times said first radius.

2. An aerator wheel assembly as claimed in claim 1 and wherein said second radius is about 2.5 times said first radius.

3. An aerator wheel assembly as claimed in claim 1 and wherein each of said tines subtends an angle along said arc of from about 45 degrees to about 80 degrees.

4. An aerator wheel assembly as claimed in claim 3 and wherein each of said tines subtends an angle along said arc of about 65 degrees.

5. An aerator wheel assembly as claimed in claim 1 and wherein four tines project from said hub.

6. An aerator wheel assembly as claimed in claim 5 and wherein said four tines are spaced about said hub at ninety degree increments.

7. An aerator wheel assembly as claimed in claim 6 and wherein each of said tines has a width and a thickness and wherein said thickness of each tine is less than said width to form a thin knife blade configuration of said tines.

8. An aerator wheel assembly as claimed in claim 7 and wherein each of said tines has an end and wherein said ends are honed or sharpened to a relative point.

9. An aerator wheel assembly as claimed in claim 7 and wherein each of said tines subtends and angle along said arc of from about 45 degrees to about 80 degrees.

10. An aerator wheel assembly as claimed in claim 9 and wherein said second radius is about 2.5 times said first radius.

11. An aerator wheel assembly as claimed in claim 10 and wherein each of said tines subtends and angle along said arc of about 65 degrees.

12. An aerator wheel assembly as claimed in claim 11 and wherein each of said tines initially projects straight and radially from said hub for a predetermined distance and thence begins to curve through said arc.

13. An aerator wheel assembly as claimed in claim 12 and wherein said predetermined distance is between about zero and about 0.5 times the radius of said hub.

14. An aerator wheel assembly comprising a substantially disc-shaped hub having a center and a radius and four curved tines projecting from said hub to respective tips, a first line being defined along and in the direction of each of said tines at the tip thereof and a second line being defined along a radius of said hub extending from said center of said hub through said tip, and angle being defined between said first and said second lines, the curve of each of said tines being predetermined such that said angle is about 33 degrees.

15. An aerator wheel assembly as claimed in claim 14 and wherein each of said tines curves through an arc of radius equal to about 2.5 times the radius of said hub.

16. An aerator wheel assembly as claimed in claim 15 and wherein each of said tines subtends and angle along said arc of about 65 degrees.

* * * * *